United States Patent [19]
Das

[11] 3,963,908
[45] June 15, 1976

[54] ENCODING SCHEME FOR FAILURE DETECTION IN RANDOM ACCESS MEMORIES

[75] Inventor: Santanu Das, Columbus, Ohio

[73] Assignee: North Electric Company, Galion, Ohio

[22] Filed: Feb. 24, 1975

[21] Appl. No.: 552,304

[52] U.S. Cl. ............... 235/153 AM; 340/146.1 AG
[51] Int. Cl.² ..................................... G06F 11/10
[58] Field of Search ........................... 235/153 AM; 340/146.1 AG; 340/174 ED

[56] References Cited
UNITED STATES PATENTS

| | | | |
|---|---|---|---|
| 3,221,310 | 11/1965 | Reach, Jr. ................ | 340/146.1 AG |
| 3,387,262 | 6/1968 | Ottaway et al. ............ | 235/153 AM |
| 3,585,378 | 6/1971 | Bouricius et al. ........... | 235/153 AM |
| 3,599,146 | 8/1971 | Weisbecker ................. | 235/153 AM |
| 3,789,204 | 1/1974 | Barlow ....................... | 235/153 AM |
| 3,806,716 | 4/1974 | Lahti et al. ................. | 235/153 AM |

*Primary Examiner*—Charles E. Atkinson
*Attorney, Agent, or Firm*—Charles M. Hutchins

[57] ABSTRACT

A virtual encoding scheme for use in random access memories is disclosed. Data errors, incorrect memory word access errors, and errors resulting from multiple memory word access are all detectable through use of the encoding scheme. The novel approach includes the generation of two distinct check code fields which are stored along with the data. A first check code field is generated as a function of the data and is capable of reflecting all unidirectional data failures. A second check code field is generated as a function of the address of the memory word containing the data and is capable of reflecting incorrect memory word access. The two check fields can be stored either in the same physical memory location as the data or in a supplementary memory at an address numerically identical to that at which the data is kept. During readout, the two check fields are regenerated and compared to those previously stored.

14 Claims, 1 Drawing Figure

ENCODING SCHEME FOR FAILURE DETECTION IN RANDOM ACCESS MEMORIES

BACKGROUND OF THE INVENTION

1. Field of the Invention

This invention relates to error detection in data processing system storage elements and, more particularly, to virtual encoding techniques for use in detecting failures in information maintained in said storage elements. Failures in devices used for accessing particular portions of said storage elements are also detectable via the virtual encoding techniques to be set out herein.

2. Description of the Prior Art

Use of encoding techniques over data about to be stored is a well-known approach to providing speedy error detection in information storage systems wherein single fault assumptions are valid.

In the reliability art, in general, it has become conventional to define a fault as a malfunction of a system component and a failure, or error, as a manifestation of a fault. Hence a single fault may result in multiple errors depending on the function of the faulty component.

Memory systems, in particular, are, in part, made up of certain components which, when faulty, give rise to multiple errors in the data handled therein. This is especially true of memory accessing circuits such as address decoders, where a single fault may give rise to multiple sections, or words, of the memory medium being simultaneously accessed. Under the multiple access situation, when attempting to read or write a first word, it becomes possible to inadvertently destroy the contents of a second word.

Prior art techniques utilizing coding to detect memory system errors are limited in that they operate on failures rather than faults. Many of these prior art schemes have successfully attacked the problems of detecting a predetermined assumed maximum number of errors in the stored data using approaches such as the well-known Hamming codes.

The incorrect accessing problem has also been solved in the prior art by providing virtual encoding of the memory word address in addition to the data to be stored. One such approach is found in U.S. Pat. No. 3,231,858 issued 25 Jan., 1966, to Tuomenoksa et al. wherein each memory word contains a single error correcting, double error detecting Hamming code computed over the concatenation of the word address and the data to be stored at that address. The code is "virtually" embedded because the address itself is never stored with the data. This scheme detects up to two errors in the data or address information but is incapable of recognizing "multiple" (i.e., in this case, more than two) errors resulting from multiple access.

The task of detection of multiple errors resulting from multiple accessing has, in the past, been assigned to rather unwieldy analog techniques. One such approach is found in U.S. Pat. No. 3,157,860 issued 17 Nov., 1964, to Batley, wherein supplementary magnetic cores are inserted in a magnetic memory's access lines for determining, via monitoring of the access currents, whether or not multiple access has occurred. Access driver current can be summed and compared with a preset allowable threshold determined by a suitable reference device such as a Zener diode, as suggested in an article by Szygenda and Flynn in "Failure Analysis of Memory Organization for Utilization in a Self-Repair Memory System," IEEE Transactions on Reliability, Volume R-20, Number 2, Pages 64–70, May, 1971.

An assumption as to the nature of multiple memory system failures that is now commonly accepted in the art is that such failures manifest themselves in unidirectional errors (i.e., all the errors will be either false zeros or false ones, but not a mixture of the two). As a result of this assumption, many prior art approaches have opted for use of fixed weight, or so-called $m$-out-of-$n$, codes for detection of multiple-unidirectional errors. An $m$-out-of-$n$ code is one in which all valid code words have exactly $m$ bits equal to 1 out of the total of $n$ bits. Although such constant weight codes can detect all unidirectional errors, they have the disadvantage of being non-separable. A code is termed "separable" only if the data bits are distinct from those bits provided for error detection. In the fixed weight codes, it is the bit pattern itself that provides error detection, and no such separation between data and check bits is possible. Separability is desirable when one wishes to easily add error detection features to an existing system without forcing a change in the existing memory word alphabet. Another salient feature of separable codes is the fact that one may choose a variable number of words over which the encoding is to take place.

Recent evolution of solid state memories constructed on integrated circuit chips has led to a similar problem with prior art failure detection schemes, since the assumption that a typical fault will cause a single bit failure is no longer valid. Analysis has shown that the most likely faults in semiconductor memory chips give rise to multiple unidirectional failures. This failure pattern analysis is discussed in more detail in "Design of a Self-Checking Microprogram Control," IEEE Transactions on Computers, Volume C-22, Number 3, Pages 255–262, March, 1973. In the case of magnetic memory systems, unidirectional errors are caused by multiple access, while in semiconductor memories, such failures are a result of the inherent compact construction of the memory medium itself in addition to any multiple access problems that may arise.

Hence a problem in the prior art is seen in connection with detecting multiple unidirectional failures in data processing memory subsystems without resort to either unwieldy analog methods or to use of non-separable codes.

SUMMARY OF THE INVENTION

OBJECTS

It is an object of this invention to provide an improved method of error detection in data processing memory systems wherein successful detection is provided covering single errors in the data, errors resulting from wrong memory word access, and multiple unidirectional errors resulting from multiple memory word access.

It is a further object of this invention to provide coding techniques which are easily used in adding improved error detection capability to existing memory systems without necessitating drastic changes in the organization of said systems.

Yet another object of this invention is to provide improved error detection capability using coding means only, while avoiding the use of unwieldy analog approaches.

SUMMARY DESCRIPTION

An error detection scheme for use with a digital informaton storage and retrieval system is provided wherein two distinct check code fields are stored along with the data in each addressable word of the system's memory medium. One code is computed over the data, and the other code is computed over the address of the memory word containing the data. The error detection process is then effected during each fetch, or read, of a memory word by regenerating the check code over the data and comparing this regenerated code with the corresponding code field previously stored with the data. Likewise, during each fetch, another code is independently regenerated over the address of the word and compared with the other corresponding code previously stored with the data. Any discrepancy found as a result of the two comparisons leads to the detection of any or all of the following:

a. Single random errors in the data
b. Wrong memory word access
c. Multiple unidirectional failures resulting from multiple memory word access.

According to one feature of this invention, separable codes are used relating to the data and the address of the data such that the resulting check fields may be stored along with the data in the same memory device or in an auxiliary memory at an address numerically equivalent to that for the associated data word. Hence the separable encoding scheme of the present invention is easily adaptable for retrofitting to existing information storage systems without necessitating changes in the data base of the old system.

Another feature of this invention is the provision of an error detection method which is applicable to both magnetic and semiconductor storage media.

DRAWING

These and other objects and features of the invention will become apparent from a reading of the following description of an illustrative embodiment taken in conjunction with the drawing.

FIG. 1 depicts a functional block diagram of an information storage system with attendant error detection circuitry suitable for use in accordance with the principles of the invention.

DETAILED DESCRIPTION

Figure 1:
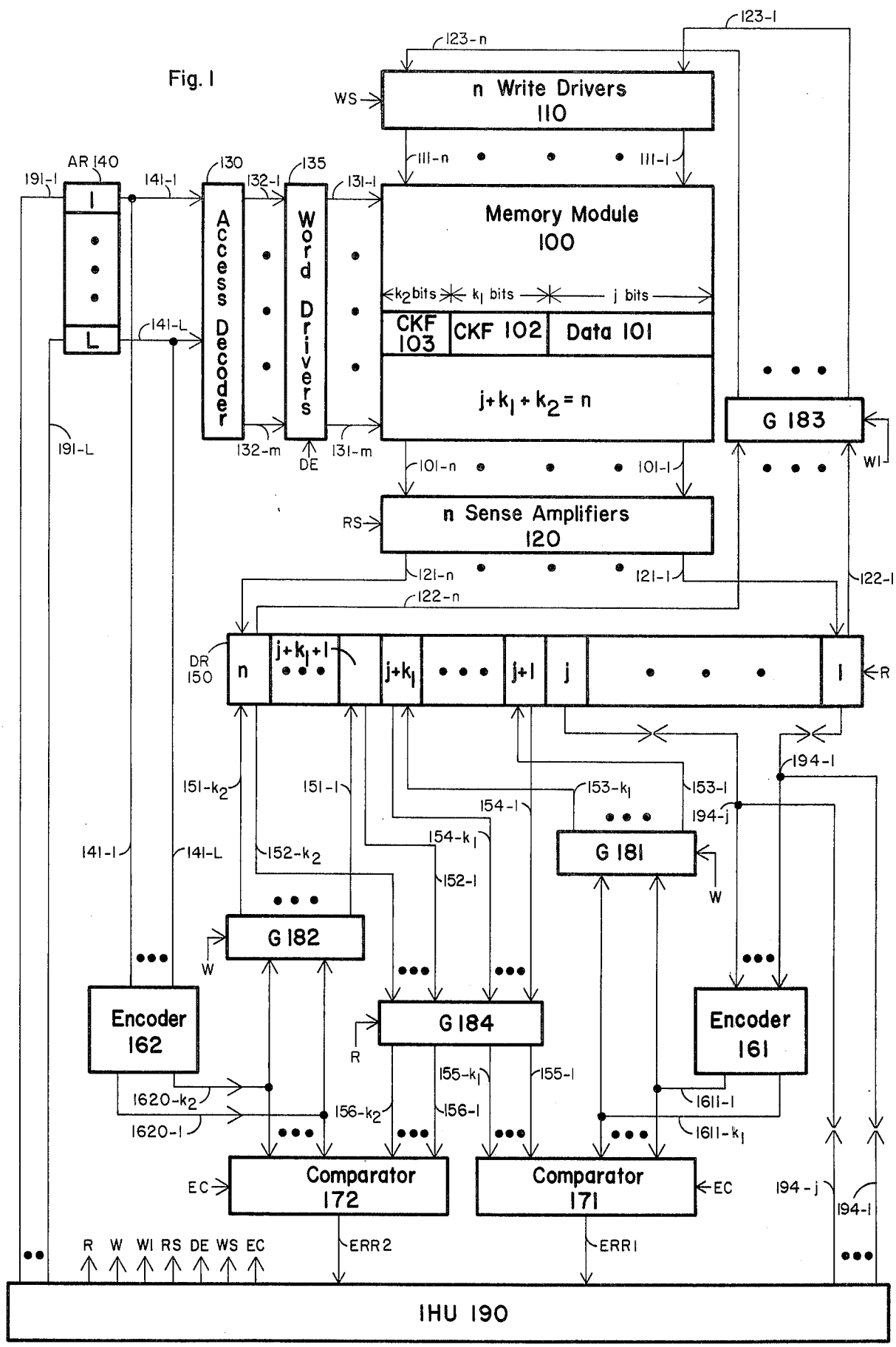

As its name implies, an information storage system functions to accept data, address, and control information, to store the data in a specified location for an indefinite time, and to return the data on demand to a parent system. The instant invention addresses the problem of ensuring that the data is returned error free and is not vitally concerned with the specific construction or design of the memory medium involved. However, for the sake of a clearer understanding of the context in which the invention is to be utilized, the basic elements of an information storage system will be set out briefly hereinafter.

In any information storage and retrieval system, the system function set forth above is usually implemented with four major categories of functionally related apparatus:

1. A data section receives, stores, and delivers information, one word, or addressable entity, at a time.
2. An access section controls the selection of the memory word being processed.
3. A cycle control section encompasses the sequential control of the signal sources which accomplish the reading and writing processes.
4. A support section supplies the operating power and thermal control.

Additionally, in most information storage systems, the information and control signals for the above four functions appear on a number of busses. One such bus, the data bus, typically carries the data bits in a data word to and from the memory system. Another bus, the address bus, typically carries the address information for specifying a particular memory location during either the store or the fetch cycle. Additionally, cycle control leads generally are employed to provide timing and control signals for the individual steps involved in the store and fetch operations.

During the store cycle, a valid address, as well as valid data, must be present on the address and data busses respectively, while during a fetch (or read) cycle only a valid address is required.

A general functional model of a random access memory system is shown as part of FIG. 1. For the sake of clarity, only that apparatus and corresponding interconnection necessary for a clear understanding of the instant invention is shown. Furthermore, it should be understood that all paths of a group of paths, as in an address or data bus, are not shown individually, also for the sake of drawing clarity. A series of dots between elements or paths is to be interpreted as representing any intermediate elements or paths not explicitly shown.

As shown in FIG. 1, an information handling unit (IHU) 190 is connected to address register (AR) 140 via address bus paths 191-l through 191-L. IHU 190 is connected to positions l through j of data register (DR) 150 and to encoder 161 via bidirectional data bus paths 194-l through 194-j. IHU 190 is also connected to various portions of the information storage system via such paths as R, W, W1, RS, DE, WS, and EC.

AR 140 presents its contents to access decoder 130 and to encoder 162 via paths 141-l through 141-L. Access decoder outputs 132-l through 132-m connect access decoder 130 to word drivers 135. The outputs of word drivers 135 are connected to memory module 100 via paths 131-l through 131-m.

The contents of any particular word of memory module 100 can be read out via paths 101-l through 101-n to sense amplifiers 120, then via paths 121-l through 121-n to the n bit positions of DR 150. When the contents of a particular word of memory module 100 are to be written, the desired contents are passed from DR 150 to write drivers 110 via paths 122-l through 122-n to gate G 183, and from G 183 via paths 123-l through 123-n. The outputs of write drivers 110 are connected to memory module 100 via paths 111-l through 111-n.

Apparatus involved with the error detection concepts of the instant invention includes encoders 161 and 162, comparators 171 and 172, and gating elements G 181, G 182, and G 184. The $k_1$ outputs of encoder 161 are connected to inputs of G 181 and comparator 171 via paths 1611-l through 1611-$k_1$. The $k_2$ outputs of encoder 162 are connected to inputs of gate G 182 and comparator 172 via paths 1620-l through 1620-$k_2$. The $k_1$ outputs of gate G 181 are connected to DR 150 positions $j + l$ through $j + k_1$ via paths 153-l through 153-$k_1$, respectively. The $k_2$ outputs of gate G 182 are connected to DR 150 positions $j + k_1 + l$ through $j + k_1 + k_2$ (or n) via paths 151-l through 151-$k_2$, respectively.

DR 150 positions $j + l$ through $j + k_1$ are connected to inputs of gate G 184 via paths 154-1 through 154-$k_1$, respectively. DR 150 positions $j + k_1 + l$ through n are connected to other inputs of gate G 184 via paths 152-1 through 152-$k_2$, respectively. The first $k_1$ outputs of G 184 are connected to corresponding inputs of comparator 171 via paths 155-1 through 155-$k_1$, while the last $k_2$ outputs of G 184 are connected to corresponding inputs of comparator 172 via paths 156-1 through 156-$k_2$. Comparators 171 andd 172 have outputs connected to IHU 190 via paths ERR1 and ERR2, respectively.

The storage medium and its attendant accessing apparatus is assumed to be under the control of a processor unit, herein designated information handling unit (IHU) 190. Any of a wide variety of processor units are suitable for use in physically implementing the concepts of the instant invention. IHU 190 could be as large as the IBM 370 processor, or, on the other hand, IHU 190 could be as small as the newly available microprocessor units such as the Motorola M6800. IHU 190 provides memory address information over paths 191-1 through 191-L (intervening paths not shown) to address register (AR) 140. The bi-directional data bus shown as paths 194-1 through 194-j (intervening paths not shown) is used by IHU 190 to pass data information bits to be stored to data register (DR) 150, and to receive data information bits read out, or fetched, from the memory via DR 150. Control paths R, RS, W, W1, WS, DE, and EC are controlled by IHU 190 to pass appropriate control signals to the memory accessing devices and registers, and their specific functions will become apparent in the detailed descriptions of read and write functions set forth in a later section of this specification.

The memory medium itself comprises memory module 100, a word-organized unit having m words of n bits each. Each word further comprises three fields. A sample word is shown in FIG. 1 having data field 101, check code field 102, and check code field 103. The use of this configuration will be discussed in detail in a later portion of this specification.

As previously noted, the specific memory word to be accessed, either for a read or a write operation, is specified by a binary information field received from IHU 190 at AR 140. AR 140 comprises L bit positions, where L is an integer of sufficient magnitude to enable representation of the highest memory word address in binary form. This binary information is then passed over paths 141-1 through 141-L to access decoder 130, wherein a conversion from binary to a 1-out-of-m code takes place in order to specify a particular word in the memory. Each of the m outputs of the access decoder, 132-1 through 132-m, is furnished with a word driver. Word drivers 135 in turn are connected to memory module 100 via paths 131-1 through 131-m, one driver to a memory word.

During a fetch, or read, the appropriate one of the paths 131-1 through 131-m is energized to effect the interrogation of one corresponding memory word. The readout signals for each of the bits stored in a memory word being interrogated are carried via paths 101-1 through 101-n to sense amplifiers 120 (one amplifier per bit), thence via paths 121-1 through 121-n to DR 150. Sense amplifiers 120 are enabled by a signal on the RS path from IHU 190. The data portion of the fetched word is gated via data bus 194-1 through 194-j to IHU 190.

During a write operation, the memory word desired is again selected from IHU 190 by passing an address via paths 191-1 through 191-L to AR 140, and to the access decoder 130 via paths 141-1 through 141-L. The selected word is then accessed over one of the paths 131-1 through 131-m. Additionally, IHU 190 forwards the data it wishes to be stored via data bus 194-1 through 194-j to DR 150. In turn, DR 150 passes the bit contents to be written over paths 122-1 through 122-n to write drivers 110 (one driver per bit). Write drivers 110 are enabled by a signal passed over path WS from IHU 190. Bit write signals are now gated from write drivers 110 over paths 111-1 through 111-n. The intersection of the bit signals with a word select signal on one of the paths 131-1 through 131-m defines the word location wherein the actual bits are altered according to the information presented to write drivers 110.

In the above discussions of the fetch and write processes, the cooperative function of encoders 161 and 162, comparators 171 and 172, and gates 181 and 182, have been ignored. These elements act in conjunction with the three fields of each memory word to effect the error detection process according to the instant invention, and they will be discussed in detail in a later portion of this specificaton.

The model for an information storage system discussed hereinabove, in conjunction with FIG. 1, is sufficiently general to represent the wide variety of storage elements available in this art field. These elements include, but are not limited to, single and multiple aperture ferrite cores, thin planar magnetic films, thick or thin circumferential films (plated wire), and semiconductor memories. Monolithic semiconductor memories do not require interface elements for providing conversion from logic level to drive level, since they do not exhibit the very large attenuation between the drive and sense levels at interfaces between the memory unit and its accessing devices. Additionally, it is to be understood that the two-dimensional (2D) memory access organization chosen for the embodiment is for the sake of example only. The concepts of the instant invention apply equally well to other memory accessing arrangements well known in the art, such as 2½D and 3D.

For the illustrative embodiment described in conjunction with FIG. 1, a magnetic core memory system is assumed. This type system is chosen since there are more accessing components required for converting from logic levels to core drive levels and conversion from read-out sense levels to logic levels. These added components, in effect, present a worst-case situation in terms of system trouble or fault sources. Hence this specific type of information storage system presents the utility of the invention in an environment wherein a high number of error sources are present.

The design and structure of magnetic core memories are well known and have been set forth in a multitude of articles and patents. One such reference is found in U.S. Pat. No. 2,910,674 issued to W. M. Wittenberg wherein a nondestructive read-out 2D core memory array comprising two cores per bit and with attendant read and write accessing circuitry is described. The elements described in the Wittenberg patent could, for the sake of example, be used for the word-organized memory module 100, word drivers 135, bit write drivers 110, and sense amplifiers 120, all of FIG. 1 of this specification.

As mentioned previously, access decoder 130 is a binary to one-out-of-*m* decoder and could be, but is not limited to, one or more SN54154 packages commercially available from Texas Instruments, Inc. AR 140 and DR 150 could be, but are not limited to, simple flip-flop registers. Such registers are also commercially available and could comprise one or more Texas Instruments SN54175 flip-flop packages.

Before setting out the actual error-detecting process of the instant invention, a discussion concerning the nature of faults affecting systems of a type as shown in FIG. 1 is in order. In the discussion, a fault is defined as a malfunction (e.g., stuck-at-zero) of a system component and a failure, or error, as a manifestation of a fault. Thus, a single fault may cause multiple failures, or errors.

If the address register and data register flip-flops for each bit are made independent by bit slicing, then a solid fault in any flip-flop will affect one register bit. If this type of fault occurs in the address register, it would result in an incorrect address being passed on to the access decoder, and a wrong word will be accessed.

Faults in the data register can manifest themselves as incorrect data being held in the data register. For example, if a data register bit is stuck-at-zero, logical 1 could never be read into that position, hence resulting in a single bit failure.

In the case of independent word drivers, the faults are such that a single solid fault in any driver will not affect any of the other word drivers. Single faults would result in conditions wherein either a selected word driver fails or two word drivers become active. In the case where no word driver is activated, the resulting read-out will result in all zeros. If two word drivers become active, the state of the bit elements in an additional word may be changed. This type fault manifests itself in unidirectional errors (i.e., all the errors will be either 1 to 0, or 0 to 1, but not both).

As an example of the distinction between unidirectional and bidirectional errors, consider a 2-bit data word comprising the error-free bit pattern 10. Unidirectional errors could produce the erroneous patterns 00 and 11. Only bidirectional errors could produce the erroneous pattern 01.

The sense amplifiers can also be made distinct for each bit and, as a result, sense amplifier faults will result in a single bit failure in the information read out to the data register. Write drivers can also be made independent, resulting in faults leading to single bit failures in information to be altered at a particular word location.

The address access decoders constitute the most complex area of accessing circuitry associated with the memory. There are three failure modes associated with a single stuck-at-zero or stuck-at-one fault in the decoding circuitry. These three are - no output active, the wrong output active, and exactly two outputs active. The case of no output active will result in reading out all zeros into the data register, since no memory word will be fully accessed during a read function. The wrong decoder output active would result in a wrong memory word being fetched. The case of two decoder outputs active presents the most difficult problem, since, under this condition, it becomes possible to access and read out a correct memory word while completely destroying the contents of a word in another section of the memory. The net effect of such multiple accessing is multiple unidirectional errors. Such an effect results from the sense amplifiers tendency to sum the read-out voltages from corresponding bits of the two accessed memory words.

A fault in the cycle control of the system would manifest itself in error patterns similar to those discussed in connection with accessing circuitry faults. For example, a read strobe failure results in read-out of all zeros - the same result as with no access.

Hence, it becomes clear that any error-detecting scheme should be able to detect a single error in the data, wrong memory word access, and multiple unidirectional errors resulting from multiple access.

A code capable of detecting multiple unidirectional errors has been described by J. M. Berger, *Information and Control*, Vol. 4, pp 68–73, April, 1961. The code set forth in Berger's article is termed a sum code. Sum codes are shown to be separable and capable of perfect error detection in a completely asymmetric communications channel. These properties are suitable for use in an information storage system wherein multiple errors are assumed to be unidirectional - an analogous case to the asymmetric communications channel.

Although not a part of the instant invention, for clarity, a prior art method for forming a sum code is now set out. Consider a string of $n-k$ information bits and $k$ check bits. A binary number corresponding to the number of ones in the information bits is formed, and the complement of each bit of the resulting number is taken. This final binary number constitutes the separable sum code over the information bits. Alternatively, the sum code could be generated by merely taking the sum of the number of binary zeros in the information bit string. Berger has shown that such a coding scheme detects all asymmetric, or unidirectional, failures. The following table sets forth an example of the sum code that would result for each of several information words consisting of four bits each:

| DATA | BINARY FORM OF SUM OF ONES IN DATA WORD | CORRESPONDING SUM CODE |
|---|---|---|
| 0000 | 000 | 111 |
| 0001 | 001 | 110 |
| 0010 | 001 | 110 |
| 0011 | 010 | 101 |
| . | . | . |
| 1111 | 100 | 011 |

For the illustrative embodiment, a sum code of the type set forth hereinabove is generated by an encoder unit over the data portion of each memory word and stored along with the data. One such check code field, 102, is shown in FIG. 1 as part of the memory word containing data field 101. Additionally, a single parity bit is generated by another encoder unit over the address of each memory word and stored in a second check code field along with the data and the first check code field. One such second check code field, 103, is also shown in FIG. 1 as part of the memory word containing data field 101. It is to be understood that the second check field for each memory word, in accordance with the principles of the invention, is not limited to such a single parity bit code. Indeed, the second check code field could take the form of a sum code generated over the address of its corresponding memory word location. However, for the preferred embodiment, a single parity bit over the address is felt to provide sufficient redundancy under a single fault assumption as applied to the address register portion of the information storage and retrieval system. Any errors resulting from multiple access will be detected by the sum code generated over the data for each memory word.

According to the instant invention, during each memory fetch, or read, cycle the parity over the memory word address is generated and compared with the parity stored with the data. Further, after each readout, the data word is checked for unidirectional errors using the sum code check bits generated over the data compared to those stored with the data. During the store cycle, the sum code over the data and parity code over the memory word address are generated separately and independently, and these two check fields are stored along with the data at the specified memory location. A detailed description of a typical read operation and a typical write operation using the encoding scheme of the instant invention will now be set forth in conjunction with FIG. 1.

For the information storage system of the illustrative embodiment, the steps of a typical memory write function are as follows:

1. a. IHU 190 gates the address of the memory word desired to be written over paths 191-1 through 191-L to AR 140.
  b. Likewise, IHU 190 gates the data contents to be written into the chosen memory word over paths 194-1 through 194-$j$ to positions 1 through $j$ of DR 150 and to the inputs of encoder 161.
2. AR 140 gates its contents over paths 141-1 through 141-L to address decoder 130 and to the inputs of encoder 162.
3. a. Encoder 161, responding to the inputs present on paths 194-1 through 194-$j$, generates a sum code and places the result on paths 1611-1 through 1611-$k_1$ as inputs to gate G181.
  b. Likewise, encoder 162, responding to the inputs present on paths 141-1 through 141-L, generates a check code (for this specific embodiment, a parity check code) and places the result on paths 1620-1 through 1620-$k_2$ as inputs to gate G182.
4. a. In response to a signal from IHU 190 sent over path W, G181 gates the generated sum code over paths 153-1 through 153-$K_1$ to positions $j+1$ through $j+k$ of DR 150.
  b. Likewise, in response to a signal from IHU 190 sent over path W, G182 gates the generated address check code over paths 151-1 through 151-$k_2$ to positions $j+k_1+1$ through n (i.e., position $j+k_1+k_2$) of DR 150.
5. In response to a signal sent from IHU 190 over path W1, DR 150 gates its full contents over paths 122-1 through 122-$n$ via gate G183 to the inputs or write drivers 110 over paths 123-1 through 123-$n$.
6. A specific memory word is selected according to the input of word drivers 135. In response to a signal sent from IHU 190 over write strobe lead WS, the selected memory word is written according to the write signals supplied to memory module 100 over paths 111-1 through 111-$n$ from write drivers 110.

As a result of the above steps, the data received from IHU 190, along with a check code field generated over the data, such as CKF 102, and a check code field generated over the memory word address, such as CKF 103, is stored at the memory location selected by IHU 190.

For the information storage system of the illustrative embodiment, the steps of a typical memory fetch, or read, function are as follows:

1. IHU 190 gates the address of the word to be read over paths 191-1 through 191-L to AR 140.
2. AR 140 gates its contents over paths 141-1 through 141-L to address decoder 130 and to the inputs of encoder 162.
3. Encoder 162, responding to inputs present on paths 141-1 through 141-L, generates a check code and places the result on paths 1620-1 through 1620-$k_2$ as inputs to comparator 172 (G182 is disabled during a read function).
4. A specific memory word is selected for reading according to the outputs of word drivers 135 which are activated in response to a signal sent from IHU 190 over word driver enable path DE. Word driver output signals are presented to memory module 100 over paths 131-1 through 131-$m$.
5. The contents of the selected memory word are presented to the inputs of sense amplifiers 120 over paths 101-1 through 101-$n$. Sense amplifiers 120 are enabled by IHU 190 over read strobe lead RS, and the results are gated over paths 121-1 through 121-$n$ to data register DR 150. At this point, DR 150 contains the data of the selected memory word in register positions 1 through $j$, the first stored check code field in register positions $j+1$ through $j+k_1$, and the second stored check code field in register positions $j+k_1+1$ through $n$.
6. a. In response to a signal sent over path R from IHU 190, DR 150 gates the data portion of its contents via paths 194-1 through 194-$j$ to encoder 161 and to IHU 190.
  b. Likewise, in response to a signal on path R, DR 150 gates the first stored check field via paths 154-1 through 154-$k_1$, through gate G184 and paths 155-1 through 155-$k_1$, as inputs to comparator 171.
  c. Likewise, in response to a signal on path R, DR 150 gates the second stored check field via paths 152-1 through 152-$k_2$, through another portion of G184 and paths 156-1 through 156-$k_2$, as inputs to comparator 172.
7. Encoder 161, in response to the inputs present on paths 194-1 through 194-$j$, generates a sum code and places the result on paths 1611-1 through 1611-$k_1$ as inputs to comparator 171 (G181 is disabled during a read function).
8. a. In response to a signal sent over path EC sent from IHU 190, comparator 171 performs a bit-by-bit comparison between the signal conditions on leads 1611-1 through 1611-$k_1$ and those signal conditions on corresponding leads 155-1 through 155-$k_1$. Any discrepancy results in an error signal being sent to IHU 190 over path ERR1.
  b. Likewise, in response to a signal sent over path EC from IHU 190, comparator 172 performs a bit-by-bit comparison between the signal conditions on leads 1620-1 through 1620-$k_2$ and those signal conditions on corresponding leads 156-1 through 156-$k_2$. Any discrepancy results in an error signal being sent to IHU 190 over path ERR2.

Comparators, such as 171 and 172 of FIG. 1, are well known in the art and could comprise one or more SN5485 packages available from Texas Instruments, Inc.

Gate elements 181, 182, 183, and 184 are comprised of a set of logical AND gates, 1 gate per path. One such set of AND gates suitable for use in the illustrative embodiment is the SN5409 available from Texas Instruments, Inc.

Encoders, such as 161 and 162, could be, but are not limited to, a well-known type employing a relatively fast solid state read-only memory (ROM) with attendant accessing circuitry. The encoding is performed by using the encoder input as an address for accessing a ROM word whose contents comprise the encoding result itself. For example, if one had an eight-bit-per-word memory in which errors were to be detected, a $2^8 = 256$ word by four-bits-per-word ROM would enable the proper encoding in sum code form. One such commercially-available ROM unit is the SN54187 from Texas Instruments, Inc.

It should be appreciated that not all control signal paths and timing interval specifications necessary for the detailed functioning of a magnetic memory system have been set forth hereinabove, as such details are not believed to be essential to an understanding of the principles of the instant invention.

It should also be noted that for the general case, FIG. 1 shows $k_2$ bits for the check code field generated over the memory word address. For the specific exemplary embodiment, only a single output lead from encoder 162 is required to generate a single parity bit over the address. For this case, any of a number of commercially available single-bit parity-check circuits are suitable for use as encoder 162. One such suitable device is the SN54180 available from Texas Instruments, Inc.

The principles of the instant invention apply equally well to embodiments other than that described in conjunction with FIG. 1. For example, the two check code fields could be stored in an auxiliary memory module physically distinct from that memory module holding the data. This approach is most feasible in those cases where the error detection scheme is to be applied to an existing information storage system.

Yet another alternative approach utilizes the property of sum codes wherein any number of memory words may be encoded as a group. In the extreme case, the sum code could be generated over all words of the memory module. The resulting check code could then be used for a periodic gross diagnostic check of the entire memory. This application is most suited to the solid state memory case wherein mean time between failures is usually quite high, thus obviating the necessity of performing an error check each time a memory word is fetched from the system.

It should be noted that the invention described herein has been illustrated with reference to a particular embodiment. It is to be understood that many details used to facilitate the descriptions of such a particular embodiment are chosen for convenience only and without limitations on the scope of the invention. Many other embodiments may be devised by those skilled in the art without departing from the scope and spirit of the invention. Accordingly, the invention is intended to be limited only by the scope and spirit of the appended claims.

What is claimed is:

1. A method for detecting errors in a digital information storage system, said system including memory means, wherein said memory means includes a plurality of individually-addressable words and wherein each individually-addressable word is further comprised of a data field, a first code field related to the data field, and a second stored code field related to the address at which the word is located, and reading means for extracting said words, said method comprising the steps of:
   a. extracting, via said reading means, one of said words;
   b. generating a first check code field suitable for use in detecting all multiple unidirectional errors in the data field of said extracted word;
   c. generating a second check code field suitable for use in detecting at least a single error in the address of said extracted word;
   d. comparing said first stored code field with said first check code field;
   e. comparing said second stored code field with said second check code field;
   f. and generating an error indication whenever said stored code fields are not identical to their corresponding generated check code fields.

2. A method as set forth in claim 1 wherein said step of generating a first check code field further comprises the steps of -
   a. determining the sum of the total number of binary ones in said data field;
   b. representing said sum as a binary number;
   c. and complementing, bit by bit, said binary number.

3. A method as set forth in claim 1 wherein said step of generating a second check code field further comprises the steps of -
   a. determining the sum of the total number of binary ones in the binary representation of said address;
   b. representing said sum as a binary number;
   c. and complementing, bit by bit, said binary number.

4. A method as set forth in claim 1 wherein said step of generating an error indication further comprises the steps of -
   a. generating a first error signal whenever said first stored code field is not identical to said first check code field;
   b. and generating a second error signal whenever said second stored code field is not identical to said second check code field.

5. A combination for detecting and indicating errors in an information storage system comprising;
   memory means including a plurality of addressable words,
   information handling means,
   memory accessing and registering means, connected to said information handling means and to said memory means, operative to extract and register a word stored in said memory means corresponding to an address provided by said information handling means,
   first encoder means, connected to and receiving inputs from said accessing and registering means, operative to generate a first check code field suitable for use in detecting all multiple unidirectional errors in a first predetermined portion of an extracted word,
   second encoder means, connected to and receiving inputs from said memory accessing and registering means, operative to generate a second check code field suitable for use in detecting at least a single error in the address of said extracted word,
   a first comparator, connected to and receiving inputs from both said memory accessing and registering means and said first encoder means, operative to generate a first error signal whenever said first check code field is not identical to a second predetermined portion of said extracted word, a second comparator, connected to and receiving inputs from both said memory accessing and registering means and said second encoder means, operative to generate a second error signal whenever said second check code field is not identical to a third predetermined portion of said extracted word, and said information handling means further including means, connected to both said first and second comparators, for processing said first and second error signals, whenever present, to indicate the occurrence of a storage system error.

6. A combinaton as set forth in claim 5 wherein said first check code field comprises a sum code.

7. A combination as set forth in claim 5 wherein said second check code field comprises a sum code.

8. A combination as set forth in claim 5 wherein said second check code field comprises a code suitable for use in detecting single random errors in said address provided by said information handling means.

9. A combination as set forth in claim 5 wherein said memory means further comprises;

a first memory module for storing said first predetermined portion of said words, and a second memory module for storing said second and said third predetermined portions of said words.

10. A combination as set forth in claim 5 wherein said first encoder means further comprises;

a word-organized read-only memory, accessing means, connected to said read-only memory, for utilizing the inputs to said first encoder means as the address of a word in said read-only memory, and output means, connected to said read-only memory, to permit the contents of the read-only memory word so addressed to be output from said read-only memory to the outputs of said first encoder means.

11. A combination as set forth in claim 5 wherein said second encoder means further comprises;

a word-organized read-only memory, accessing means, connected to said read-only memory, for utilizing the inputs to said second encoder means as the address of a word in said read-only memory, and output means, connected to said read-only memory, to permit the contents of the read-only memory word so addressed to be output from said read-only memory to the outputs of said second encoder means.

12. A combination as set forth in claim 5 wherein said second encoder means further comprises;

parity check generator means, with inputs connected to said memory accessing and registering means, operative to produce a single parity check bit in response to the binary address information received over said inputs from said memory accessing and registering means, and means for transmitting said single parity check bit to the output of said second encoder means.

13. A method for detecting errors in a digital information storage system, said system including memory means, wherein said memory means include a plurality of individually addressable words and wherein each individually addressable word is further comprised of a data field, a first stored code field related to the data field, and a second stored code field related to the address at which the word is located, and reading means for extracting said words, said method comprising the steps of:

a. extracting, via said reading means, one of said words;

b. generating a first check code field suitable for use in detecting all multiple unidirectional errors in the data field of said extracted word;

c. generating a second check code field suitable for use in detecting at least a single error in the address of said extracted word;

d. comparing said first stored code field with said first check code field;

e. comparing said second stored code field with said second check code field;

f. and generating an error indication whenever said stored code fields do not exhibit a predetermined relationship to their corresponding generated check code fields.

14. A combination for detecting and indicating errors in an information storage system comprising;

memory means including a plurality of addressable words, information handling means, memory accessing and registering means, connected to said information handling means and to said memory means, operative to extract and register a word stored in said memory means corresponding to an address provided by said information handling means, first encoder means, connected to and receiving inputs from said accessing and registering means, operative to generate a first check code field suitable for use in detecting all multiple unidirectional errors in a first predetermined portion of an extracted word, second encoder means, connected to and receiving inputs from said memory accessing and registering means, operative to generate a second check code field suitable for use in detecting at least a single error in the address of said extracted word, a first comparison means, connected to and receiving inputs from both said memory accessing and registering means and said first encoder means, operative to generate a first error signal whenever said first check code field does not exhibit a predetermined relationship to a second predetermined portion of said extracted word, a second comparison means, connected to and receiving inputs from both said memory accessing and registering means and said second encoder means, operative to generate a second error signal whenever said second check code field does not exhibit a predetermined relationship to a third predetermined portion of said extracted word, and said information handling means further including means, connected to both said first and second comparison means, for processing said first and second error signals, whenever present, to indicate the occurrence of a storage system error.

* * * * *